Feb. 8, 1949.    J. E. WHITFIELD    2,460,957
HOUSING JOINT
Filed Dec. 20, 1944    4 Sheets-Sheet 1
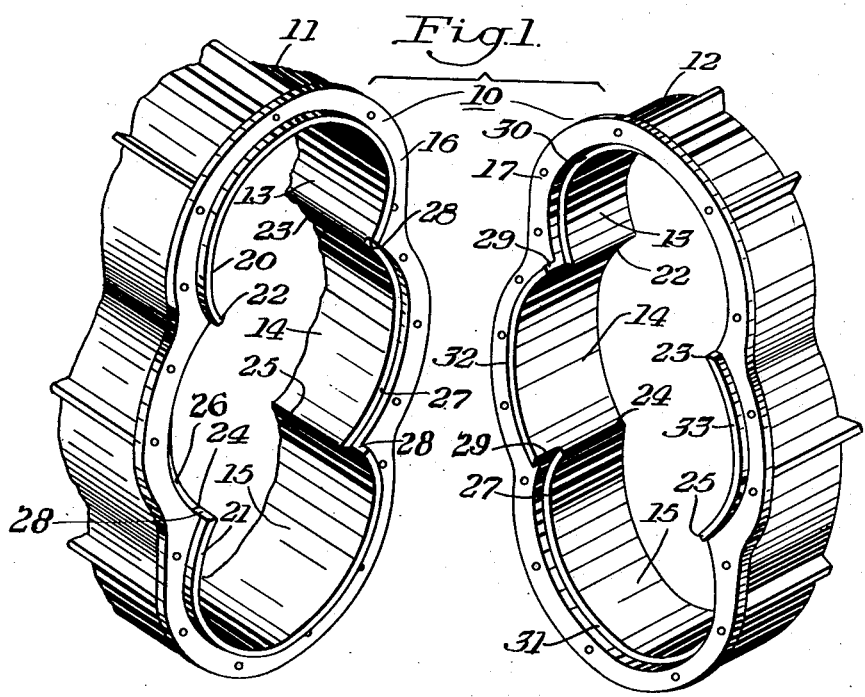
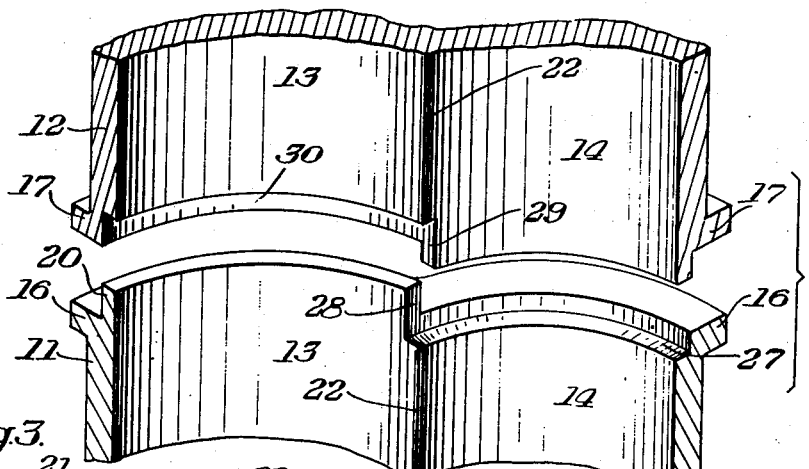
INVENTOR.
Joseph E. Whitfield Feb. 8, 1949.                J. E. WHITFIELD                2,460,957
                               HOUSING JOINT
Filed Dec. 20, 1944                                    4 Sheets-Sheet 2

INVENTOR.
Joseph E. Whitfield
BY
Edward R. Lawrence
his attorney

Feb. 8, 1949.  J. E. WHITFIELD  2,460,957
HOUSING JOINT

Filed Dec. 20, 1944  4 Sheets-Sheet 3

INVENTOR.
Joseph E. Whitfield
BY Edward A. Laurens
his Attorney

Feb. 8, 1949. J. E. WHITFIELD 2,460,957
HOUSING JOINT
Filed Dec. 20, 1944 4 Sheets-Sheet 4

INVENTOR.
Joseph E. Whitfield
BY

Patented Feb. 8, 1949

2,460,957

UNITED STATES PATENT OFFICE 2,460,957

HOUSING JOINT

Joseph E. Whitfield, Hamilton, Ohio

Application December 20, 1944, Serial No. 569,082

3 Claims. (Cl. 285—130)

This invention relates generally to the construction of housings or casings and more particularly to the joint between adjacent housing sections or end plates on housings and the method of making the same.

This housing joint is particularly advantageous for use on housings or casings having dual compartments such as employed in the housings of fluid pumps, motors, blowers and the like wherein two intermeshing rotary members operate in parallel cylindrical chambers which merge into one another forming a single large chamber. Such a device is disclosed in Letters Patent No. 2,287,716.

Structures of this character require a single housing casting with removable end plates that must be split in order to properly machine the mating interengaging surfaces between the end plates and housing or between the end plates themselves.

The principal object of this invention is the provision of an improved joint for connecting sections of multiple chambered housings or casings and end plates for the same.

Another object is the provision of a joint for multiple chambered housings that simplifies the machining in constructing the same.

Another object is the provision of an interlocked joint for multiple chambered housings that maintains alignment of the parts and provides an improved seal.

Another object is the provision of a joint for multiple chambered housings which may be completely machined at one setting for each chamber.

Another object is the provision of a multiple chambered housing having an intermediate joint with interlocking parts.

Another object is the provision of an interlocking joint that provides positive alignment of the parts.

Other objects and advantages appear in the following description and claims.

A practical embodiment illustrating the principles of this invention is shown in the accompanying drawings wherein:

Fig. 1 is an isometric view of complementary interlocking joint parts of a multiple chambered housing.

Fig. 2 is a fragmentary view illustrating a corner of a joint about to be closed.

Fig. 3 is a fragmentary view illustrating the joint of Fig. 2 when closed.

Figure 4:
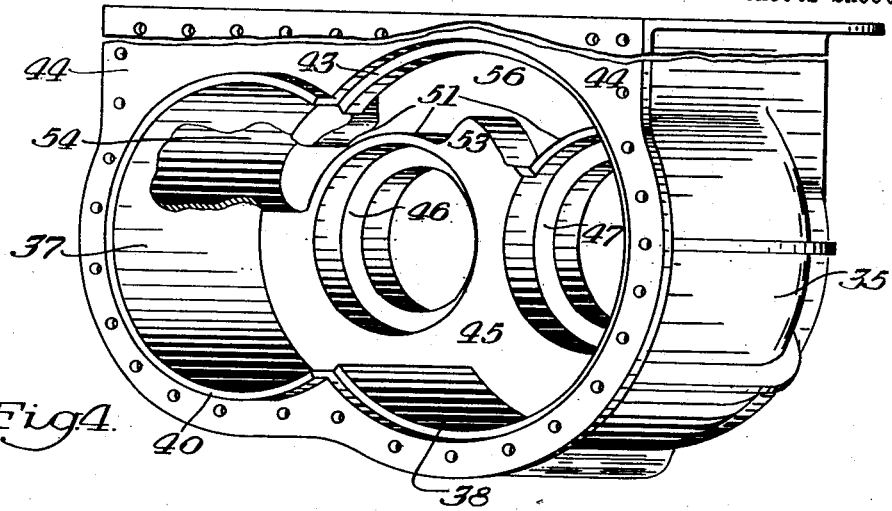
Fig. 4 is a perspective view showing one-half of a screw blower housing having an interlocking joint intermediate of the length of the housing.
Figure 5:
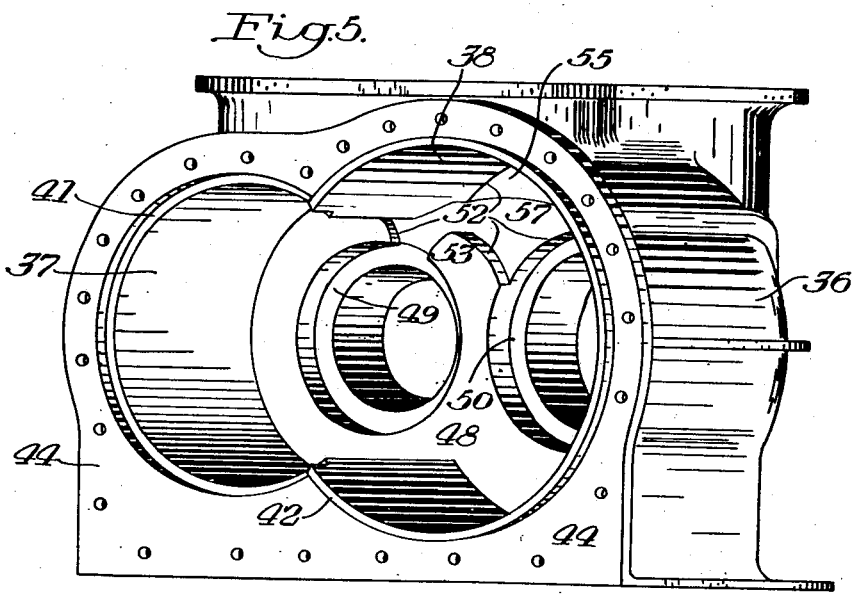
Fig. 5 is a perspective view showing the mating half of the housing shown in Fig. 4.

Referring to Fig. 1 of the drawing, the housing 10 is made up in two sections 11 and 12 and contains three cylindrical chambers 13, 14 and 15 which connect to form a large common chamber. The axes of these three chambers are parallel but it is immaterial whether or not they lie in a common plane. The section 11 represents the main portion of the housing whereas the section 12 is a shallow head or end plate. The ends of the housing sections 11 and 12 are provided with mating radial flanges 16 and 17 having a series of holes therethrough to receive bolts to secure the sections together. A flat gasket may be placed between the abutting faces of these flanges for the purpose of shimming and sealing the assembled housing sections since these faces are in a common transverse plane.

The end of the chamber 13 in the housing section 11 is provided with an axially projecting flange 20 which extends beyond the surface of the transverse flange 16. The interior surface of the axial flange 20 is a portion of the cylindrical wall of the chamber 13. The end of the chamber 15 is provided with a similar axial flange 21. Owing to the fact that these chambers 13 and 15 are interrupted where they intersect the central chamber 14 the axial flanges 20 and 21 are also interrupted. But these axial flanges terminate short of the defined intersections 22, 23, 24 and 25 between the three chambers, since the end of the central chamber 14 is provided with recessed arcuate grooves or shoulders 26 and 27 the axial surface of which provide the end faces 28 of the axial flanges 20 and 21.

The mating portion of the housing joint on the housing section or head 12 is provided with complementary axial flanges and grooves. Chamber 13 is provided with the arcuate groove 30 arranged to receive the axial flange 20 and the chamber 15 is provided with a like groove 31 to receive the axial flange 21. The joint end of the central chamber 14 of the housing section 12 is provided with the axial flanges 32 and 33 arranged to enter the respective grooves 26 and 27 of the housing section 11.

The axial surfaces of the grooves 30 and 31 likewise provide the end faces 29 of the axial flanges 32 and 33. When the sections 11 and 12 are fitted together the outer edges of the adjacent flange and faces 28 and 29 pass one another and when they are fully meshed there is a void 34 along each of the chamber intersecting edges 22, 23, 24 and 25 as shown on Figs. 2 and 3. Each of these voids 34 has the same cross section as the adjacent axial flanges and extends from the radial surface of the flange 26 to the radial surface of the flange 30 between the chambers 13 and 14. If the volume of the void 34 is detrimental small plugs of the same size may be formed and secured to the ends of the axial flanges 32 and 33.

In Figs. 4 to 7 the housing sections 35 and 36 are arranged to be joined in the center. This housing contains only two chambers 37 and 38 which are similar to the chambers 13 and 14 of Fig. 1. The axial flange 40 at the end of chamber 37 in the housing section 35 mates with the groove 41 in the end of the same chamber of the housing section 36. Likewise the flange 42 of housing section 36 mates in the groove 43 of the housing section 35. When the housing sections are assembled and bolted they provide a tight joint along the mating faces which lie in the radial plane 44. The blower housing section 35 of Fig. 4 has the end wall 45 with the spaced annular bearing seats 46 and 47 which are axially aligned with their respective cylindrical chambers 37 and 38. In like manner the end wall 48 of the housing section 36 shown in Fig. 5 has the spaced annular bearing seats 49 and 50 axially aligned with the same cylindrical chambers 37 and 38 respectively.

Figure 8:
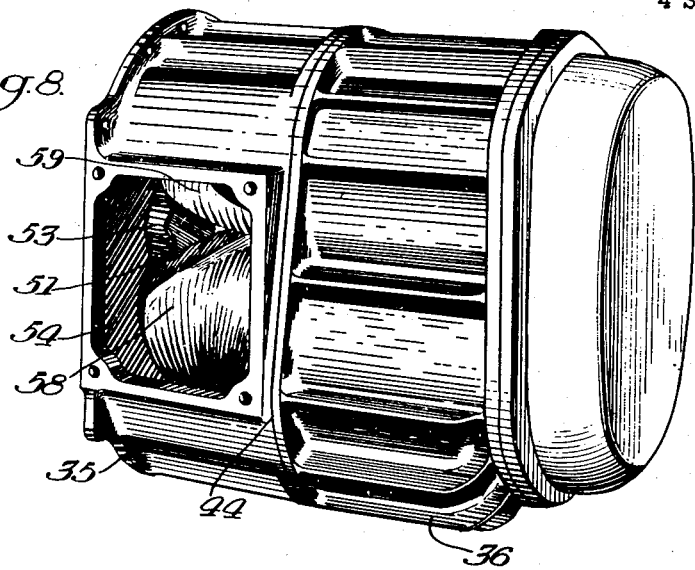
Fig. 8 is a perspective view showing the assembled housing sections similar to that shown in Figs. 4 to 7.

When these blower housing sections are assembled as shown in Fig. 8 the ports 51 and 52 are diametrically disposed from one another. They follow a contour partially described by the ends of the rotors in the end and side walls of the chambers. The upwardly projecting section 53 of the ports seal the ends of the rotors when their toothed forms are substantially fully intermeshed. A portion of the housing shown in Fig. 4 is cut away to show how the ports are connected by the passageways 54 and 55 to the exterior of the housing on opposite sides of the latter since the ends of the housings are closed by the end walls 56 and 57 and must provide for the rotor shafts and connections. The rotor members 58 and 59 with their shafts and bearing assemblies are placed in one housing section and the other housing section is then mounted thereon and bolted in place with the opposed flanges and grooves intermeshing to lock the sections in accurate alignment and in tight sealing engagement.

Figure 6:
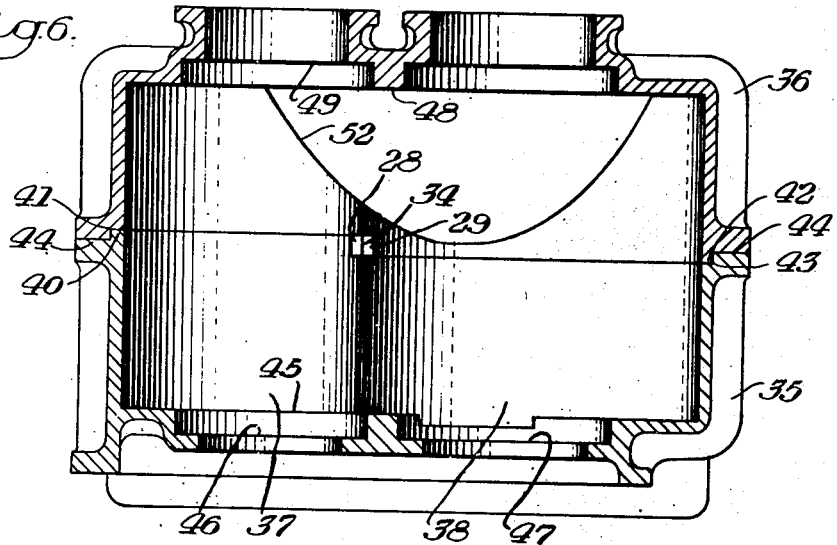
Fig. 6 is a sectional view of the screw blower housing taken through the axes of both chambers.
Figure 7:
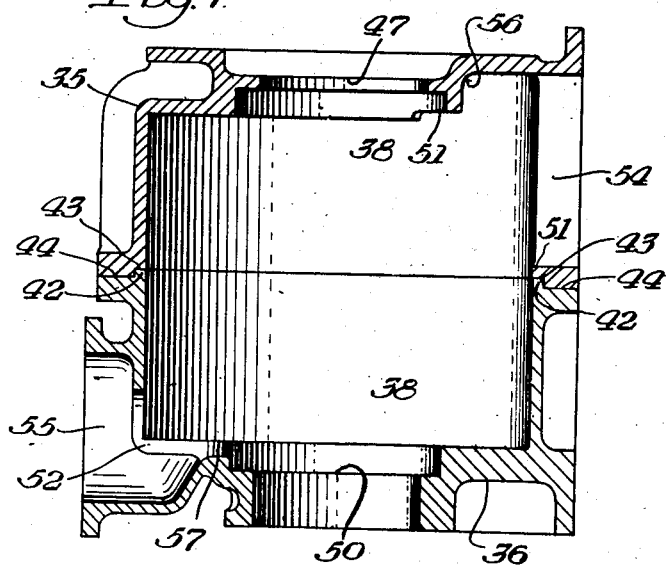
Fig. 7 is a sectional view taken along the axis of one chamber of the blower housing.

As illustrated in Fig. 6 the chambers 37 and 38 of the blower housing are shown in a transverse section taken along a plane intersecting the axes of these chambers. The recess 34, formed by the end faces 28 and 29 of the adjacent flanges, appears in the intersection 70 of the two chambers at the joint between the housing sections. This recess is bisected by the transverse plane 44 and the edge 70 defining the intersection between the parallel chambers 37 and 38. The plane 44 and the intersection 70 are at right angles to one another. As shown this void 34 is spaced from the edge of the port 51 and does not interfere with the operation of the blower.

Figure 9:
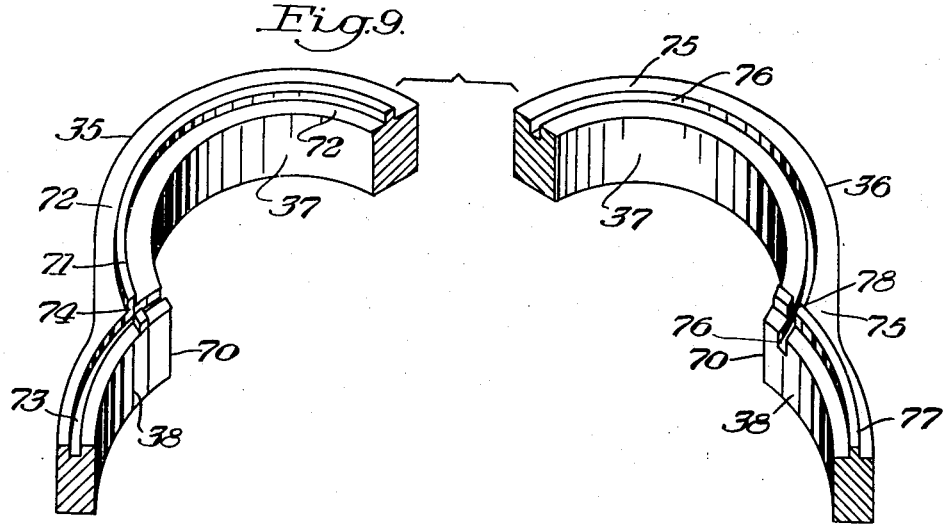
Fig. 9 is a perspective fragmentary view of mating housing sections showing a modification of the joint comprising this invention.

The modification of the flange and groove joint shown in Fig. 9 provides the same interlocking and aligning characteristic features as that shown in Figs. 1 to 8 but eliminates the exposed void 34 in each side of the housing. The projecting flange 71 that encircles the chamber 37 is formed intermediate of the width of the mating faces 72 which are disposed in the plane 44 that is transverse to the axis of chambers on the housing section 35. The adjacent chamber 38 is encircled by the groove 73 that is formed intermediate the face 72. In forming the groove 73 a section 74 of the flange 71 is cut away. The face 75 of the mating section 36 of the housing is provided with a matched groove 76 to receive the flange 71 and a matched flange 77 to enter the groove 73. A void 78 is also formed in the flange 77 where it is intersected by the groove 76. When these sections 35 and 36 are joined together the voids 74 and 78 formed by the grooves passing through the flanges are within the wall of the housing and are thus not exposed to the chambers 37 and 38 and a block is not required in this instance to fill the void.

Each type of joint properly aligns and seals the housing sections. The complementary flanges and grooves may be cut at the same setting that the chambers and bearing seats are turned which simplifies production.

I claim:

1. A partible housing comprising a plurality of sections, each section having a plurality of cavities complementary to the cavities of another section, the open ends of the cavities in a section are provided with transversely disposed flat surfaces arranged to mate in engagement with a complementary transverse surface of an adjacent section, and an axially disposed complementary flange bordering a cavity on one section and a groove bordering a complementary cavity on another section adjacent the flat surfaces, adjacent cavities of a section being alternately provided with flanges and grooves.

2. A joint for a partible multichambered housing wherein chamber in one housing part intersect one another to form a common chamber which consists of a transverse face encircling the open ends of the cavities of each housing section and arranged to mate in surface contact, alternate axially disposed flanges and grooves in the transverse face encircling adjacent chambers of one housing section, and alternate mating grooves and flanges in the transverse face of the other housing section, the flanges and grooves of the housing sections interengaging to seal and lock the chambers in axial alignment.

3. A joint for a partible multichambered housing wherein chamber in one housing part intersect one another to form a common chamber which consists of a transverse face encircling the open ends of the cavities of each housing section and arranged to mate in surface contact, alternate axially disposed flanges and grooves intermediate the edges of the transverse face encircling adjacent chambers of one housing section, and alternate mating grooves and flanges intermediate the edges of the transverse face of the other housing section, the flanges and grooves of the housing sections interengaging to seal and lock the chambers in axial alignment.

JOSEPH E. WHITFIELD.

REFERENCES CITED

The following references are of record in the file of this patent:

UNITED STATES PATENTS

| Number | Name | Date |
|---|---|---|
| 1,155,664 | Lambert | Oct. 5, 1915 |
| 1,781,091 | Wilson | Nov. 11, 1930 |
| 2,247,125 | Hall | June 24, 1941 |